Nov. 26, 1963　　　　　A. ROSIN　　　　　3,112,439
FLUX OSCILLATOR TRANSFORMER WITH VARIABLE SHUNT
Filed Sept. 19, 1961　　　　　　　　　　　　2 Sheets-Sheet 1

*INVENTOR.*
ARTHUR ROSIN
BY Alfred W. Barber
ATTORNEY

Nov. 26, 1963
A. ROSIN
3,112,439
FLUX OSCILLATOR TRANSFORMER WITH VARIABLE SHUNT
Filed Sept. 19, 1961
2 Sheets-Sheet 2
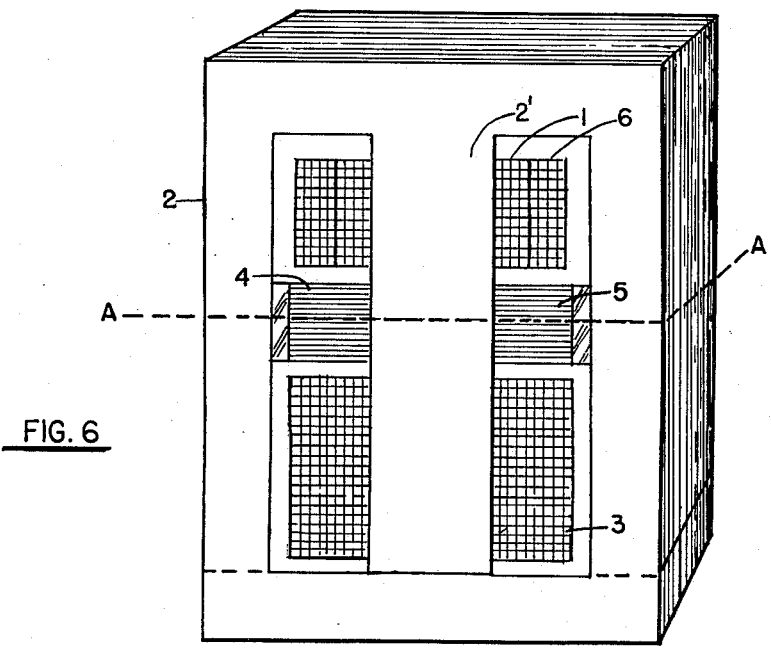
FIG. 6
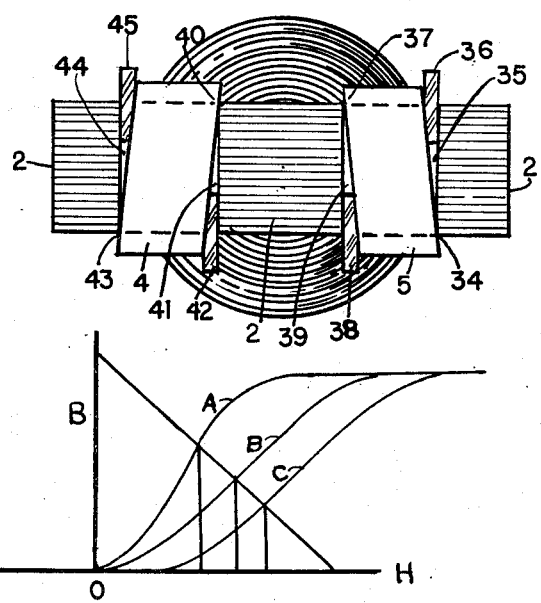
FIG. 7
FIG. 8
INVENTOR.
ARTHUR ROSIN
BY Alfred W. Barber
ATTORNEY 3,112,439
FLUX OSCILLATOR TRANSFORMER WITH VARIABLE SHUNT
Arthur Rosin, Little Neck, N.Y., assignor to Forbro Design Inc., New York, N.Y., a corporation of New York
Filed Sept. 19, 1961, Ser. No. 139,099
6 Claims. (Cl. 323—56)

The present invention concerns voltage regulating alternating current transformers and, in particular, the type of voltage regulating transformers utilizing the flux oscillator principal.

One of the most widely used voltage regulating alternating current transformer types is the type which may be referred to as a "flux oscillator." Basically this transformer utilizes an inductor wound on a core of magnetic material having a substantially rectangular magnetization curve and shunted by a suitable capacitor such that there is a natural flux oscillation at a frequency which is determined by the magnetic circuit characteristics. This is chosen to be substantially the frequency of the alternating current which is to be applied to the transformer. In operation, voltage across the capacitor causes flux to build up in the inductor at a substantially uniform rate and thereby maintaining a constant voltage across the inductor until saturation of the core is reached. Since the core has a rectangular magnetization curve, the sloping part of the curve is substantially linear and its saturation point is sudden and sharp. At the instant of saturation, the inductance and hence the impedance of the inductor drops sharply causing the capacitor to discharge into the inductor. The inductor immediately returns the charge to the capacitor charging it in reversed polarity and the flux starts to change in the core in the opposite direction so that a substantially constant reverse voltage is maintained across the inductor. The inductor and capacitor are chosen so that the rate of this alternate square wave generation is substantially equal to the frequency of the alternating current to be applied, say 60 cycles per second. It works out that if the inductor-capacitor combination is connected to a load and power is supplied to it from an alternating current source through a series impedance, that the system will be maintained in flux oscillation as described above and will deliver a constant voltage to the load as long as the frequency of the input power is kept constant. The value of the series impedance required to maintain proper flux oscillation depends on the load, i.e. it depends on the power being drawn from the oscillating circuit. In the past these flux oscillating transformers have been designed for operation at a predetermined load and it has been found that problems arise when it is attempted to operate over a wide range of load values especially when the load is made quite small (high impedance).

It has been found according to the present invention that the series impedance may be made to vary automatically with load thereby maintaining nearly ideal operating conditions over a wide range of load impedances. This automatically variable series impedance is obtained by utilizing leakage inductance between a primary connected to the source of power and a secondary connected to the load. The leakage reactance is controled by a magnetic shunt. The principal feature of the present invention is to form the shunt so that its effective air gap is wedge shaped and varies from substantially zero to a predetermined value. This construction has been found to provide a magnetic shunt which varies with load curent and is apparently the result of a progressive saturation effect in the wedge area. As a result of this construction a flux oscillating transformer is provided which is capable of supplying more watts to the load per pound of magnetic material, utilizes a smaller capacitor for a given power rating and is less critical in the construction and adjustment of the magnetic shunt circuit.

Accordingly the principal object of the present invention is to provide methods of and means for increasing the load capacity of flux oscillator voltage regulating transformers.

Another object is to provide a flux oscillator circuit in which a smaller capacitor is required for a given power handling capacity.

Still another object is to provide a flux oscillating transformer which is easier and cheaper to build than such transformers hitherto available.

These and other objects will be apparent from the detailed description of the invention given in the following specification in connection with the various figures of the drawing.

In the drawing:

FIGURE 6 is a view, partly diagramatic, of a flux oscillator transformer in accordance with the present invention.

FIGURE 7 is a cross-sectional view of the transformer shown in FIG. 6 taken along line A—A.

FIGURE 8 is a series of curves useful in explaining the operation of the system in accordance with the present invention.

Figure 1:
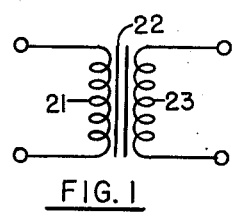
FIGURE 1 is a simple schematic of an iron cored transformer having a primary and a secondary.
Figure 2:
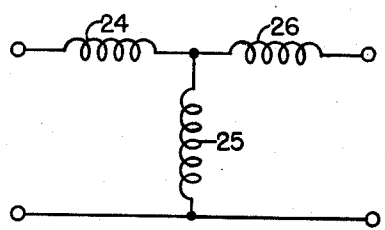
FIGURE 2 is the equivalent circuit representation for the transformer of FIG. 1.
Figure 3:
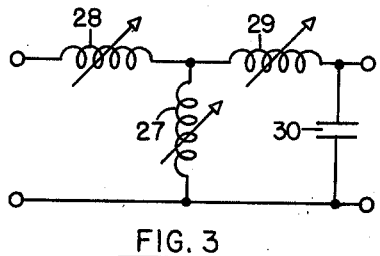
FIGURE 3 is the equivalent circuit of a flux oscillator having a variable coupling coefficient between primary and secondary.
Figure 4:
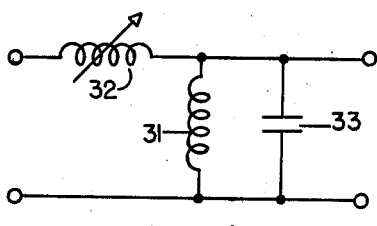
FIGURE 4 is the basic circuit of a flux oscillator having a variable input choke.

The representation in FIG. 1 is that of a simple transformer having a primary 21 and a secondary 23 wound on a core 22. The equivalent circuit is shown in FIG. 2 where the mutual inductance is represented by inductor 25, the primary inductance minus the mutual inductance by inductor 24 and the secondary inductance minus the mutual inductance by inductor 26. This equivalent circuit has been shown with variable inductors or coupling connected as a flux oscillator in FIG. 3. Here inductor 28 representing the primary minus the mutual inductance may be considered the series impedance to the flux oscillator while inductors 27 and 29 in series representing mutual and secondary minus mutual respectively shunted by capacitor 30 from the oscillating circuit. A further variation of this circuit is shown in FIG. 4 where variable inductor 32 represents a variable series impedance to the flux oscillator formed of inductor 31 shunted by capacitor 33.

Figure 5:
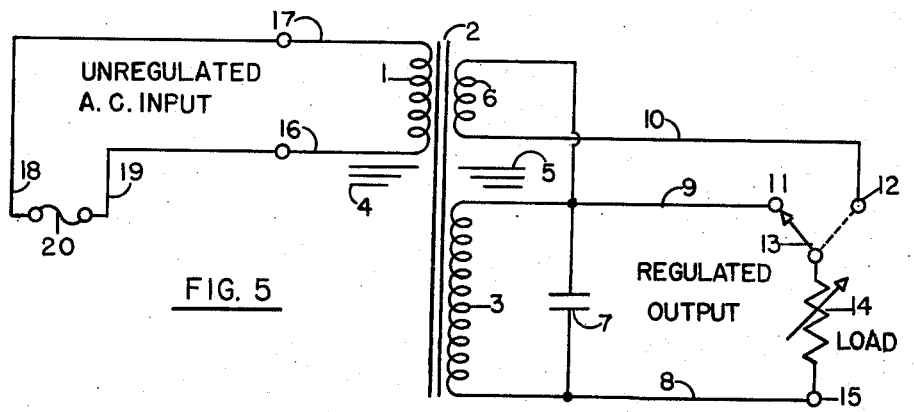
FIGURE 5 is a schematic circuit of a flux oscillator transformer and circuit in accordance with the present invention and connected between a source of power and a load impedance.

The preferred form of the present invention is shown in FIG. 5 where primary 1 is wound on a core 2 which also carries coupled coils 3 and 6. The degree of coupling between coils 1 and 3 depends on the shunting effect of automatically variable shunts 4 and 5 one possible form of which are shown below in FIGS. 6 and 7. Primary 1 has terminals 16 and 17 adapted to connect to a source of alternating current power 20 of frequency $f$ over leads 18 and 19. Secondary 3 shunted by a suitable capacitor 7 forms a flux oscillator circuit adapted to supply regulated voltage to a load such as 14 over leads 8 and 9 to terminal 15 and through switch 11—13. An alternate circuit to the load is provided by closing switch 12—13 so that compensating winding 6 over lead 10 is included in series for providing an induced compensating voltage. The automatically varying shunts 4 and 5 provide a flux oscillator circuit which operates over a wide range of load impedances. This also provides a circuit which permits the use of smaller and cheaper magnetic circuit components for a given power transfer. The automatic shunt is characterized by maximum shunting effect at low power transfer (maximum load impedance) and decreasing shunting effect as the power transfer increases (load impedance decreases). In the preferred form of the invention as set forth herein, this automatic variation of shunting effect is apparently provided by a progressive saturation of the shunts. This saturation causes the effective reluctance of the shunt to change as the load is varied and in the direction indicated above.

FIG. 6 is a view, partly diagrammatic, of a flux oscillator transformer in accordance with the present invention, FIG. 7 may be considered along with FIG. 6 since it shows a cross-section taken along line A—A of the latter. The numbers used in FIGS. 6 and 7 correspond as far as possible with the numbers used in FIG. 5 for the same or corresponding parts or circuit elements. The preferred form of core structure is made up of laminations of the so called "E" and "I" type providing two winding windows. Coils 1 and 6 are wound concentrically around the upper part of straight laminations 2' while coil 3 is wound around the lower part of laminations 2'. In order to provide the desired coupling between coils 1 and 3, magnetic shunts 4 and 5 are provided between these coils and bridging between core 2' and the inner sides of core 2. With this circuit and magnetic configuration, the leakage inductance between coils 1 and 3 determines the equivalent series impedance to the flux oscillator. In the past magnetic shunting between these coils 1 and 3 has been provided with a fixed constant cross-sectional area air gap. This gap is critical since the effect it provides varies rapidly with gap length. It has been found that cocking the shunt so that the air gap has a wedge shape of varying effective length provides the advantages set forth above. This cocking is readily provided by wedging the shunts from opposite sides as with wedges 36—38—42—45 of non-magnetic material and preferably, of insulating material such as wood or plastic. These shunts essentially touch the core 2 and 2' at opposite edges 34—37 and 40—43 the only separation being very thin insulation to prevent shorted turn effects with a core mounting frame so that the effective air gap starts from substantially zero and increases to the thickness of the wedges. The shunts are formed of magnetic laminations preferably oriented, at right angles to the laminations of the main core 2 and 2'. It has been found that as the load is varied on a voltage regulating transformer constructed as just described exhibits an apparent automatic variation of shunt effect and hence apparent automatic variation of equivalent series impedance to the flux oscillator.

FIG. 8 is a series of curves to illustrate the automatic shunt effect. Curve A shows a magnetization curve characteristic of operation at low power output which is a curve indicating a magnetic circuit with little or no effective air gap. Curve B is characteristic of the circuit of moderate loads. Curve C is characteristic of maximum load and is a curve indicating a substantial effective air gap. Thus, the circuit shows a characteristic which changes from that of a circuit with little or no air gap at no load or very light load, through a characteristic showing an effective intermediate air gap at moderate loads to a characteristic showing a large effective air gap at large loads. Hence, we have a magnetic circuit which shows an automatic effective air gap characteristic in proportion to and in accordance with the applied load.

One important advantage of the present invention as set forth above is that the core structure utilizes standard lamination forms. The "E" and "I" combination is readily available and hence no special dies are required for its manufacture. Even the cocked shunt laminations are formed by cutting up the pieces punched from the openings of the E and the I may be supplied as well from these pieces. Thus standard punchings may be used and little or no waste is produced resulting in a very inexpensive transformer.

While only one embodiment of the present invention has been shown and described many modifications will be apparent to those skilled in the art and within the spirit and scope of the invention as set forth in particular in the appended claims.

What is claimed is:

1. In a voltage regulating transformer, the combination of, a magnetic core structure, an input winding coupled to said core for connecting to a source of unregulated alternating current, an output winding coupled to said core for providing a regulated output voltage, a capacitor in shunt with said output winding for providing an oscillating flux in said output winding in the presence of a predetermned frequency of alternation in said source, and a magnetic shunt adapted to provide a wedge shaped air gap with said core for providing a magnetic shunt between said input winding and said output winding.

2. In a voltage regulating transformer and circuit, the combination of, a magnetic core structure, an input winding coupled to said core for supporting current from a source of unregulated alternating current, an output winding coupled to said core for providing a regulated voltage to a load circuit, a capacitor shunting said output winding for providing an oscillating flux in said output winding in the presence of a predetermned frequency of alternation in said source, and a magnetic shunt path between said windings including at least one wedge shaped air gap.

3. In a voltage regulating transformer and associated circuit, the combination of, a magnetic core structure, an input winding coupled to said core for supporting current from a source of unregulated alternating current, an output winding coupled to said core for providing a regulated voltage to a load circuit of variable impedance, a capacitor shunting said output winding for providing an oscillating flux in said output winding, and a magnetic shunt including a wedge shaped non-magnetic flux path between said windings automatically saturable in accordance with the impedance of said load circuit for controlling the effective coupling between said input and said output windings.

4. In a voltage regulating transformer, the combination of, at least an input winding and an output winding coupled by means of a magnetic core, and a variably saturable magnetic shunt including a wedge shaped non-magnetic flux path between said windings for automatically adjusting the coupling between said windings in accordance with loading of said output winding.

5. A voltage regulating transformer as set forth in claim 4 in which said magnetic shunt is adapted to provide a wedge shaped air gap with said magnetic core.

6. A voltage regulating transformer as set forth in claim 4 in which said magnetic shunt is adapted to provide at least one wedge shaped air gap with said magnetic core forming a gap progressing from a gap of the order of .001 inch to a gap of the order of .125 inch.

References Cited in the file of this patent

IBM Technical Disclosure Bulletin, vol. 3, No. 3 (page 25) (August 1960).